United States Patent [19]

Miyata et al.

[11] Patent Number: 4,591,616
[45] Date of Patent: May 27, 1986

[54] OPTICAL PLASTICS MATERIAL USING METHACRYLIC RESIN AND FLUOROCOPOLYMER

[75] Inventors: Seizo Miyata; Satoru Kobayashi, both of Tokyo, Japan

[73] Assignee: Central Glass Company, Limited, Ube, Japan

[21] Appl. No.: 768,051

[22] Filed: Aug. 22, 1985

[30] Foreign Application Priority Data

Aug. 30, 1984 [JP] Japan .................. 59-179175

[51] Int. Cl.$^4$ .............. C08L 27/16; C08L 33/08; C08L 33/10
[52] U.S. Cl. ................. 525/185; 351/159; 528/220; 528/401
[58] Field of Search .......... 525/185; 528/220, 401; 351/159

[56] References Cited

FOREIGN PATENT DOCUMENTS 59-41348 3/1984 Japan .
59-62657 4/1984 Japan .

OTHER PUBLICATIONS

Chemical Abstracts, vol. 101, No. 22, 11/28/84; p. 97; Abstract No. 193849u; JP 59/35,257; 03 Aug '84, "Vinylidene Fluoride Polymer Solutions".

*Primary Examiner*—Jacob Ziegler
*Attorney, Agent, or Firm*—Fleit, Jacobson, Cohn & Price

[57] ABSTRACT

Copolymers of vinylidene fluoride (VDF) and hexafluoroacetone (HFA) exhibit lower indices of refraction than polymethyl methacrylate (PMMA) and can be blended well with PMMA at widely variable ratios. The obtained blends are thermoplastic resins which can easily be moulded or extruded into desirably shaped and transparent members having good mechanical properties and weather resistance. The blends are soluble in various organic solvents. It is preferable that the amount of HFA in the copolymer is not more than 90 mol %. The refractive index of a member formed of the blend falls in the range of about 1.37–1.49 and can freely be controlled by controlling the weight ratio of PMMA to VDF/HFA copolymer. The blend is useful for optical fibers, cylindrical lenses, etc.

9 Claims, 7 Drawing Figures

OPTICAL PLASTICS MATERIAL USING METHACRYLIC RESIN AND FLUOROCOPOLYMER

BACKGROUND OF THE INVENTION

This invention relates to an optical plastics material which is a blend of two kinds of polymers different in refractive index. One of the polymers is a methacrylic resin and the other a copolymer of fluoro-compounds.

Some kinds of plastics have long been used as optical materials for lenses, prisms. etc. Also in recently developing optical fibers for light communications and for displaying and advertising purposes optical plastics are attracting great interest. Particularly for transmission of light over relatively short distances the role of plastics optical fibers is important since optical fibers of this category are superior in flexibility and workability to the popular quartz optical fibers though inferior in respect of transmission loss.

Plastics optical fibers currently produced on the commercial basis are limited to the step-index type fibers, which consist of a plastics core that exhibits a relatively high index of refraction and a plastics cladding that exhibits a lower index of refraction. As the core material acrylic resins represented by poly(methyl methacrylate) is prevailing. The cladding material is usually selected from fluoropolymers as will be understood from the degree of atomic refraction. Examples are polymers of fluorine-substituted acrylates or methacrylates and vinylidene fluoride base copolymers.

Researches have also been conducted on optical plastics materials of the graded-index type in which the refractive index decreases gradually from the central axis radially toward the periphery. Such materials are essential for the development of the graded-index plastics fibers for transmission of light and, besides, will be valuable for special lenses.

As to means of producing plastics optical materials of the graded-index type or desirably controlling the refractive indices of plastics materials, trials have been given to graft copolymerization, photocopolymerization, modification of conventional polymers by chemical reaction and blending of polymers different in refractive index. Among these methods, blending of a polymer relatively high in refractive index with another polymer lower in refractive index is deemed simple, easy and widely applicable. However, this method has rarely provided practicable optical plastics. The main reason for the unsuccess is that two kinds of polymers greatly different in refractive index are in most cases poor in compatibility or mutual solubility, so that a blend of such polymers becomes low in mechanical strength and also in transparency when moulded or extruded into a desired shape.

SUMMARY OF THE INVENTION

It is an object of the present invention to provide an optical plastics material, which is a blend of two kinds of polymers having considerably different indices of refraction and being capable of blending well each other at any ratio so that the refractive index of the blend is controllable over a wide range, and which can easily be formed into tough and very transparent members of desired shapes.

The present invention provides an optical plastics material, which consists essentially of a blend of a methyl methacrylate base polymer with a copolymer of vinylidene fluoride and hexafluoroacetone.

In this invention the methyl methacrylate base polymer is usually poly(methyl methacrylate) (PMMA) but, if desired, may be a copolymer of a relatively large amount of, and preferably not less than 50 mol % of, methyl methacrylate with another methacrylate or an acrylate.

We have chosen PMMA as the basic component of a new optical plastics material. As is well known, PMMA is high in transparency and exhibits a refractive index of about 1.49. There are many kinds of fluoro polymers and copolymers having lower indices of refraction than PMMA. However, we have discovered that copolymers of vinylidene fluoride (VDF) with hexafluoroacetone (HFA) are superior in compatibility or mutual solubility with PMMA and can be blended well with PMMA at widely variable ratios, and that the obtained blends are thermoplastics resins which can readily be moulded or extruded into desirably shaped and very transparent members having good mechanical properties and weather resistance. It is preferred to use a VDF/HFA copolymer comprising 1-20 mol % of HFA for the reasons described hereinafter. The blending ratio between a methyl methacrylate base polymer and a VDF/HFA copolymer can freely be varied over the range from 99:1 to 1:99 by weight, though it is preferable to limit the maximum amount of the copolymer to 90 wt % where both transparency and thermal stability are very important.

The refractive index of a member formed of an optical plastics material according to the invention falls within the range from about 1:37 to about 1.49 and can freely be controlled by controlling the weight ratio of PMMA to VDF/HFA copolymer. By utilizing excellent transparency and appropriate indices of refraction, the optical plastics materials according to the invention can be used for various kinds of light transmitting devices or elements such as optical fibers of the graded-index type, cladding of optical fibers of the step-index type and lenses including cylindrical lenses. Besides, the blends according to the invention can be used for producing transparent plastic films and also for producing transparent and weather resistant coatings by utilizing good solubilites of the blends in various organic solvents.

DESCRIPTION OF THE PREFERRED EMBODIMENTS

Figure 1:
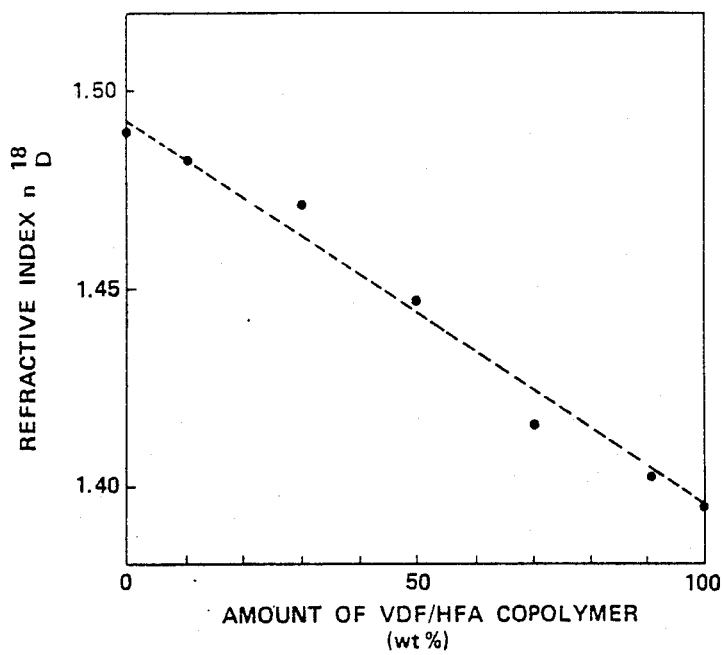
FIG. 1 is a graph showing the dependence of the refractive index of an optical material according to the invention on the content of the fluoro copolymer.

Usually PMMA is used as the methyl methacrylate base polymer in the present invention. PMMA is a popular synthetic resin that is obtained by polymerizing methyl methacrylate by a usual radical polymerization method. For the practice of the invention PMMA resins on the market are of use. It is also possible to use a modified methacrylate polymer which is obtained by copolymerizing methyl methacrylate with another methacrylate or an acrylate for the purpose of modifying the workability or some mechanical properties of PMMA. Examples of suitable comonomers are methyl acrylate, ethyl acrylate, n-butyl acrylate, 2-ethylhexyl acrylate, ethyl methacrylate, isopropyl methacrylate, n-butyl methacrylate and 2-ethylhexyl methacrylate. In the case of such a copolymer, it is suitable that the amount of methyl methacrylate in the copolymer is not less than 50% by mol so that the favorable properties of PMMA may not significantly be lost by copolymerization.

A copolymer of VDF with HFA for use in this invention can be prepared by radical copolymerization reaction, which is carried out in an organic liquid medium in the presence of an oil-soluble radical polymerization initiator usually at a temperature in the range from about 0° C. to about 70° C. It is preferred to use a VDF/HFA copolymer in which the molar ratio of VDF to HFA is from 80:20 to 99:1. VDF/HFA copolymers containing more than 20 mol % of HFA are rubber-like elastomers which are lower than 100° C. in melting point or thermosoftening temperature. Blends of such rubber-like copolymers with PMMA are inferior in workability or formability, and mouldings of such blends will suffer from lowness of thermosoftening temperature.

Blending of a methyl methacrylate base polymer (will be represented by PMMA) with a VDF/HFA copolymer can be accomplished by any method that is applicable to blending of conventional thermoplastic polymers. For example, PMMA and the VDF/HFA copolymer is blended and kneaded under appropriate heating in a conventional mixer such as Henschel mixer, V-type blender, ribbon blender or planetary mixer. A solution blending method is also practicable since there are many kinds of organic solvents in which both PMMA and VDF/HFA copolymers are well soluble. Examples of such solvents are tetrahydrofuran, dimethylacetamide, dimethylformamide, acetonitrile, some ketones represented by acetone and some esters represented by ethyl acetate. The blending is accomplished by the steps of dissolving PMMA and a VDF/HFA copolymer in a selected solvent, pouring the mixed solution into water or a suitable organic liquid such as methanol to cause precipitation of a desired blend and drying the precipitate.

The obtained blend is a themoplastic material that can easily be formed into desired solid shapes by using conventional shaping methods for thermoplastic resins, such as extrusion, compression moulding, injection moulding or caldendering. In the shaping operations it is suitable to keep the blend heated at 120°–300° C., and preferably at 140°–250° C., depending on the composition of the blend. It is also possible to obtain a highly transparent cast-film of the blend by spreading a solution of the blend in an organic solvent which can dissolve both PMMA and VDF/HFA copolymer on a glass plate or an alternative substrate and then evaporating the solvent.

It is characteristic of VDF/HFA copolymers to be soluble in methyl methacrylate monomer. By utilizing this property of VDF/HFA copolymers it is possible to accomplish preparation of PMMA and blending of PMMA with a VDF/HFA copolymer simultaneously. That is, a desired blend is obtained by first dissolving the VDF/HFA copolymer in methyl methacrylate monomer and, after adding a radical polymerization initiator, keeping the solution heated until completion of polymerization of methyl methacrylate. Such a method has not been reported for blending of PMMA with any fluoro resin other than VDF/HFA copolymers.

The invention will further be illustrated by the following nonlimitative examples.

EXAMPLE 1

PMMA and a VDF/HFA copolymer in which the molar ratio of VDF to HFA was 91:9 were used as blend components.

First, 90 parts by weight of PMMA and 10 parts by weight of the VDF/HFA copolymer were dissolved in tetrahydrofuran to obtain a solution in which the total concentration of the polymers was about 2 wt %. The solution was dropped into water to cause precipitation of a blend of PMMA with the copolymer. The precipitate was recovered by filtration, washed with methanol and dried under vacuum to thereby obtain a powder of the desired blend. By the same method, additional four kinds of blends were prepared by varying the weight ratio of PMMA to the VDF/HFA copolymer to 70:30 to 50:50, to 30:70 and to 10:90, respectively.

Each of these four kinds of blends was press-shaped at 150°–170° C. by application of a pressure of 200 kg/cm$^2$ into a film having a thickness of about 0.1 mm. The five kinds of films different in composition were all transparent.

For each of these five kinds of films, the refractive index at 180° C. ($n_D^{18}$) was measured with Abbe's refractometer of Type II using the D line of the sodium spectrum and methyl salicylate ($n_D^{20} = 1.53$) as the intermediate liquid. The test piece used for calibration had a refractive index ($n_D^{20}$) of 1.74. For comparison, the same measurement was made also on a film of PMMA and a film of the VDF/HFA copolymer. The results are shown in the following table and also in FIG. 1.

| Blend | | |
|---|---|---|
| PMMA (wt %) | VDF/HFA Copolymer (wt %) | Refractive Index $n_D^{18}$ |
| 100 | 0 | 1.490 |
| 90 | 10 | 1.482 |
| 70 | 30 | 1.471 |
| 50 | 50 | 1.446 |
| 30 | 70 | 1.414 |
| 10 | 90 | 1.401 |
| 0 | 100 | 1.393 |

Figure 2:
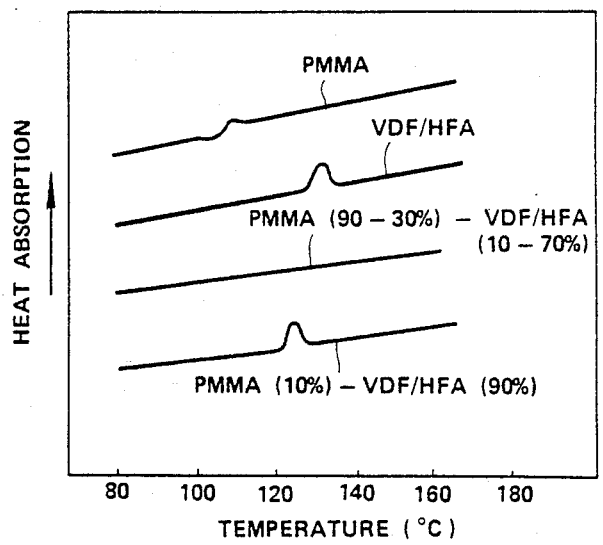
FIG. 2 is a chart showing calorimetric characteristics of examples of optical materials according to the invention and polymers used as raw materials.

Furthermore, the seven kinds of films shown in the table were subjected to thermal analysis by differential scanning calorimetry (DSC). The results were as shown in FIG. 2. In the case of the VDF/HFA copolymer sample a melt-indicating peak appeared in the DSC chart. In the cases of the blends of PMMA with the VDF/HFA copolymer, a similar melt-indicating peak appeared only when the weight ratio of PMMA to the copolymer was 10:90. This fact indicates that a crystalline phase of VDF/HFA copolymer was somewhat retained in the 10/90 blend sample. In the other blend samples lower in the content of the copolymer such a crystalline phase had disappeared. This was confirmed by X-ray diffraction analysis. From a comparison of the film of the 10/90 blend with the films of the other four kinds of blends, it was recognized that the existence of a uniformly non-crystalline phase in an optical material according to the invention makes the most important contribution to good transparency of the optical material.

EXAMPLE 2

PMMA and the VDF/HFA copolymer (molar ratio 91/9) were used as blend components.

Four kinds of blends were prepared by the same method as in Example 1. In this example the weight ratio of PMMA to the VDF/HFA copolymer dissolved in tetrahydrofuran was varied to 70:30, 60:40, 40:60 and 10:90. Each of these four kinds of blends was press-shaped into an about 0.1 mm thick film under the same temperature and pressure conditions as in Example 1.

Figure 3:
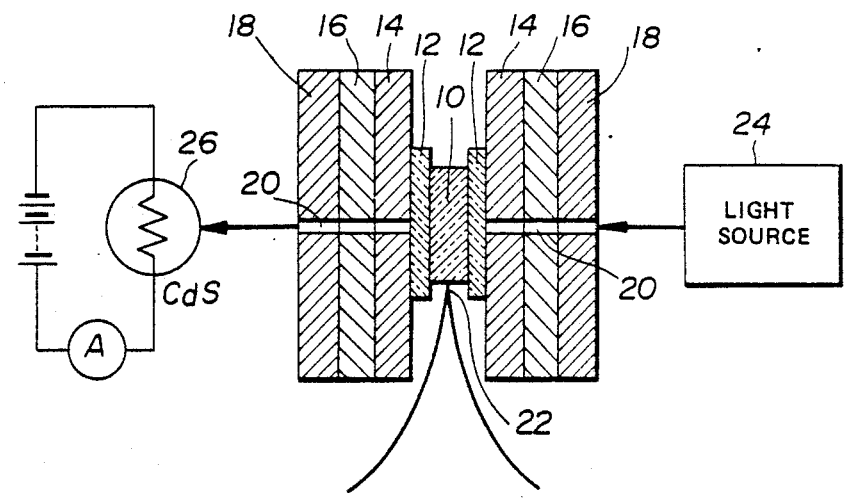
FIG. 3 is a schematic illustration of a light transmittance measuring device.
Figure 4:
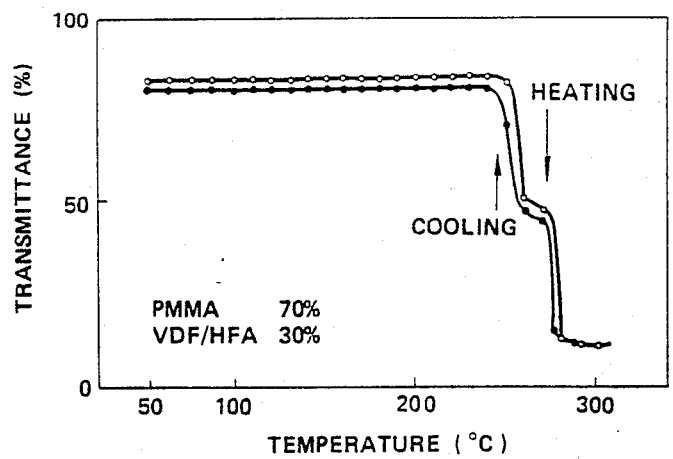
FIGS. 4-7 are graphs showing the relationship between temperature and light transmittance in four examples of optical materials according to the invention.
Figure 5:
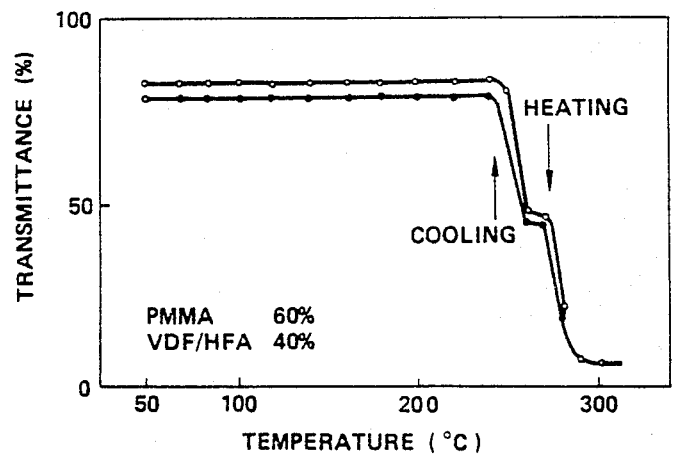
Figure 6:
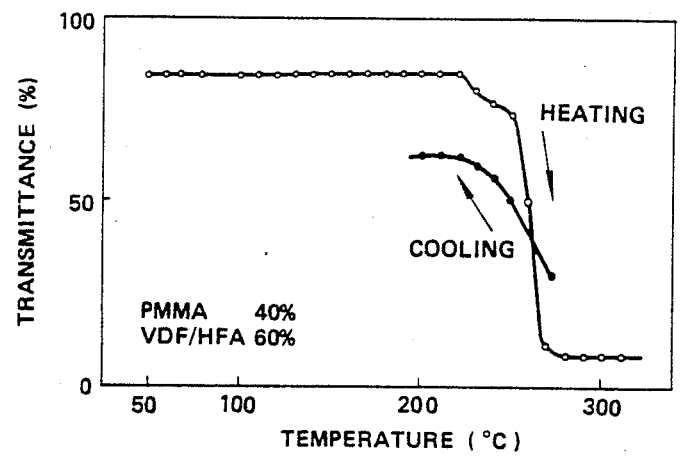
Figure 7:
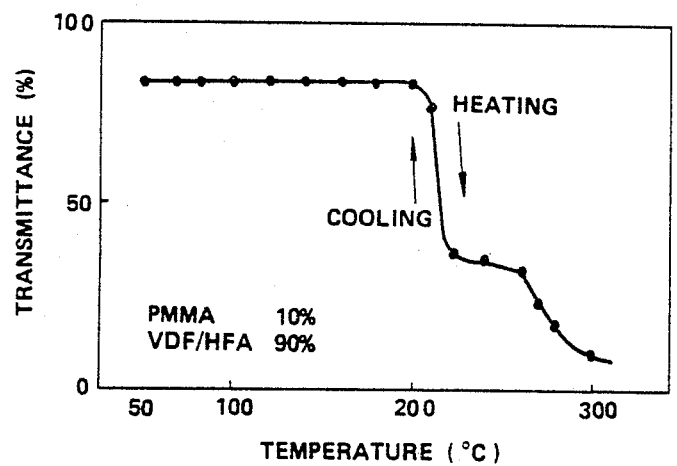

For each of these four kinds of films, light transmittance was measured at various temperatures ranging from room temperature to about 300° C. by using a device shown in FIG. 3. Each film sample 10 was sandwiched between two sheets of transparent glass 12, and a copper plate 14 was placed on the outer side of each glass sheet 12. A heater plate 16 was placed on each copper plate 14, and a copper plate 18 was placed on each heater plate 16. A hole 20 having a diameter of 5 mm was bored through the laminate of the copper plates 14, 18 and the heater plate 16 on each side of the film sample 10 such that the two holes 20 were in axial alignment and were directed normal to a central area of the film sample 10 covered by the glass sheets 12. The copper plates 14, 18 were used to rapidly establish thermal equilibrium in the film sample 10 when the heaters 16 were energized. A thermocouple 22 was used to measure the temperature of the film sample 10. A light source 24 and a CdS photoconductor cell 26 were arranged on the axis of the holes 20. For each film sample 10, light transmittance was measured while the temperature was gradually raised and then gradually lowered.

The results of the measurement are shown in FIGS. 4–7 for the 70/30, 60/40, 40/60 and 10/90 blends of PMMA/copolymer, respectively. As can be seen in FIGS. 4–7, the tested films were very high in transparency over a temperature range from room temperature to at least 200° C. and exhibited a sharp decrease in transmittance when heated up to a temperature of 210°–250° C., which was variable depending on the amount of the VDF/HFA copolymer in the blend. The measurement of transmittance was repeated on a plurality of samples for each blend, and it was found that the reproducibility of the temperature-transmittance curves was very good. That is, errors were only a few degrees centigrade with respect to the temperature at which the transmittance begins to sharply decrease.

EXAMPLE 3

A blend of 60 parts by weight of PMMA and 40 parts by weight of a VDF/HFA copolymer, in which the molar ratio VDF/HFA was 81/13, was prepared by the solution blending method described in Example 1. The blend was press-shaped into an about 0.1 mm thick film under the same temperature and pressure conditions as in Example 1. At room temperature the light transmittance of this film was measured to be 83% by using the device shown in FIG. 3.

Using another VDF/HFA copolymer in which the molar ratio VDF/HFA was 94/6, another blend of PMMA (60 wt %) and the copolymer (40 wt %) was prepared by the same method and tested in the same manner. In this case the light transmittance at room temperature was 76%.

EXAMPLE 4

The VDF/HFA copolymer (molar ratio 91/9) used in Example 1 was dissolved in methyl methacrylate monomer, which was refined by distillatioln in advance, so as to obtain 10 wt % solution of the copolymer. As a radical polymerization initiator, 0.5 wt % of benzoyl peroxide was dissolved in the solution. The solution was put into a glass reaction tube having an inner diameter of 10 mm, and the gas atmosphere in the apparatus including the reaction tube was completely replaced by nitrogen gas. After that the solution in the reaction tube was kept heated at 80° C. for 5 hr to thereby accomplish polymerization of methyl methacrylate. As the result, the solution turned into a transparent solid cylinder which was formed of a blend of PMMA with the VDF/HFA copolymer.

An about 1 mm thick disc was cut out of the above cylinder. After polishing the refractive index of this disc at 18° C. was measured to be 1.481. By the device of FIG. 3, the light transmittance of this disc at room temperature was measured to be 73%.

What is claimed is:

1. An optical plastics material consisting essentially of a blend of a methyl methacrylate base polymer with a copolymer of vinylidene fluoride and hexafluoroacetone.

2. An optical plastics material according to claim 1, wherein the molar ratio of vinylidene fluoride to hexafluoroacetone in said copolymer is in the range from 99:1 to 80:20.

3. An optical plastics material according to claim 1, wherein said methyl methacrylate base polymer is poly(methyl methacrylate).

4. An optical plastics material according to claim 1, wherein said methyl methacrylate base polymer is a copolymer of methyl methacrylate and an acrylate or methacrylate selected from the group consisting of methyl acrylate, ethyl acrylate, n-butyl acrylate, 2-ethylhexyl acrylate, ethyl methacrylate, isopropyl methacrylate, n-butyl methacrylate and 2-ethylhexyl methacrylate.

5. An optical plastics material according to claim 4, wherein the amount of methyl methacrylate in said methyl methacrylate base polymer is not less than 50 mol %.

6. An optical plastics material according to claim 1, wherein the weight ratio of said methyl methacrylate base polymer to said copolymer is in the range from 99:1 to 1:99.

7. An optical plastics material according to claim 6, wherein said weight ratio is in the range from 99:1 to 10:90.

8. An optical plastics material according to claim 1, wherein said blend is solidified from a heated and fluidized state.

9. An optical plastics material according to claim 1, wherein said blend is solidified from a solution thereof by removing solvent therefrom.

* * * * *